United States Patent
Pan et al.

(10) Patent No.: US 12,451,813 B2
(45) Date of Patent: Oct. 21, 2025

(54) METHOD FOR SWITCHING BETWEEN FORWARD OPERATION AND REVERSE OPERATION OF ISOLATED BIDIRECTIONAL DC-DC CIRCUIT, CONTROLLER, BIDIRECTIONAL CONVERTER, AND CHARGING SYSTEM

(71) Applicant: Sungrow Power Supply Co., Ltd., Hefei (CN)

(72) Inventors: Daidong Pan, Hefei (CN); Wei Liu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 211 days.

(21) Appl. No.: 18/450,530

(22) Filed: Aug. 16, 2023

(65) Prior Publication Data
US 2024/0223096 A1  Jul. 4, 2024

(30) Foreign Application Priority Data
Dec. 30, 2022  (CN) .......................... 202211742647.2

(51) Int. Cl.
*H02M 3/335* (2006.01)
*H02M 3/00* (2006.01)

(52) U.S. Cl.
CPC ......... *H02M 3/33584* (2013.01); *H02M 3/01* (2021.05); *H02J 2207/20* (2020.01)

(58) Field of Classification Search
CPC ............... H02M 3/33584; H02M 3/01; H02M 3/33569; H02M 3/33573; H02M 3/33576
See application file for complete search history.

(56) References Cited

U.S. PATENT DOCUMENTS 10,587,201 B1  3/2020  Chen et al.
2021/0249963 A1*  8/2021  Kajiyama ......... H02M 3/33573
(Continued)

FOREIGN PATENT DOCUMENTS

CN       206807298 U   12/2017
CN       113364301 A   9/2021
WO   WO 2023/127464 A1   7/2023

OTHER PUBLICATIONS

Extended European Search Report for European Application No. 23190780.9, dated Jan. 30, 2024.
(Continued)

*Primary Examiner* — Alex Torres-Rivera
(74) *Attorney, Agent, or Firm* — Wolf, Greenfield & Sacks, P.C.

(57) ABSTRACT

A method for switching between a forward operation and a reverse operation of an isolated bidirectional DC-DC circuit, a controller, a bidirectional converter, and a charging system are provided. The method includes: on receiving a switching signal, controlling a second bridge arm circuit to stop synchronous rectification, and adjusting phases of driving signals of two bridge arm branches in the first bridge arm circuit; in a case that the output current of the second bridge arm circuit reaches a first predetermined current, controlling the first bridge arm circuit to stop operating, and adjusting phases of driving signals of two bridge arm branches in the second bridge arm circuit; and in a case that the output current of the second bridge arm circuit reaches a second predetermined current, controlling the first bridge arm circuit to resume operating and perform synchronous rectification.

11 Claims, 7 Drawing Sheets

On reception of a switching signal, control a second bridge arm circuit to stop performing synchronous rectification, and gradually adjust phases of driving signals outputted to two bridge arm branches in a first bridge arm circuit to adjust an output current of the second bridge arm circuit — S100

In a case that the output current of the second bridge arm circuit reaches a first predetermined current, control the first bridge arm circuit to stop operating, and gradually adjust phases of driving signals outputted to two bridge arm branches in the second bridge arm circuit — S200

In a case that the output current of the second bridge arm circuit reaches a second predetermined current, control the first bridge arm circuit to resume operating and perform synchronous rectification — S300

(56) References Cited

U.S. PATENT DOCUMENTS

2022/0216805 A1\* 7/2022 Itogawa ............ H02M 3/33584
2022/0393606 A1 12/2022 Itogawa et al.

OTHER PUBLICATIONS

Li et al., A smooth mode-switching strategy for bidirectional OBC base on V2G technology. 2019 IEEE Applied Power Electronics Conference and Exposition (APEC). Mar. 17, 2019:3320-4.

\* cited by examiner

METHOD FOR SWITCHING BETWEEN FORWARD OPERATION AND REVERSE OPERATION OF ISOLATED BIDIRECTIONAL DC-DC CIRCUIT, CONTROLLER, BIDIRECTIONAL CONVERTER, AND CHARGING SYSTEM

The present disclosure claims priority to Chinese Patent Application No. 202211742647.2, titled "METHOD FOR SWITCHING BETWEEN FORWARD OPERATION AND REVERSE OPERATION OF ISOLATED BIDIRECTIONAL DC-DC CIRCUIT, CONTROLLER, BIDIRECTIONAL CONVERTER, AND CHARGING SYSTEM", filed on Dec. 30, 2022, with the China National Intellectual Property Administration, which is incorporated herein by reference in its entirety.

FIELD

The present disclosure relates to the technical field of direct current-direct current (DC-DC) converters, and in particular to a method for switching between a forward operation and a reverse operation of an isolated bidirectional DC-DC circuit, a controller, a bidirectional converter, and a charging system.

BACKGROUND

A two-stage on-board charger or a charging station usually includes a front-stage AC-DC converter and a rear-stage isolated DC-DC converter. To meet the requirements of vehicle-to-grid (V2G) technology, both the AC-DC converter and the DC-DC converter are required to have the function of bidirectional power flow.

Resonant CLLC is a common bidirectional isolated DC/DC topology, having advantages such as high efficiency, high power density and achieving ZVS at a primary side and ZCS at a secondary side. Frequency conversion control is usually performed to achieve a wide voltage adjustment range. However, due to the frequency limitation of the switching device, the power cannot be controlled to a small value, thus smooth switching between a forward operation and a reverse operation cannot be realized.

SUMMARY

A method for switching between a forward operation and a reverse operation of an isolated bidirectional DC-DC circuit is provided according to the present disclosure, to solve the problem that the isolated bidirectional DC-DC circuit cannot be smoothly switched between a forward operation and a reverse operation according to the conventional technology.

To achieve the above objectives, a method for switching between a forward operation and a reverse operation of an isolated bidirectional DC-DC circuit is provided according to the present disclosure. The method includes: on reception of a switching signal, controlling a second bridge arm circuit to stop performing synchronous rectification, and gradually adjusting phases of driving signals outputted to two bridge arm branches in a first bridge arm circuit to adjust an output current of the second bridge arm circuit; in a case that the output current of the second bridge arm circuit reaches a first predetermined current, controlling the first bridge arm circuit to stop operating, and gradually adjusting phases of driving signals outputted to two bridge arm branches in the second bridge arm circuit; and in a case that the output current of the second bridge arm circuit reaches a second predetermined current, controlling the first bridge arm circuit to resume operating and perform synchronous rectification.

In an embodiment, before gradually adjusting the phases of the driving signals outputted to the two bridge arm branches in the first bridge arm circuit, the method further includes: detecting the output current of the second bridge arm circuit; in a case that the output current of the second bridge arm circuit does not reach the first predetermined current, increasing frequencies of the driving signals outputted to the first bridge arm circuit to adjust a switching frequency of the first bridge arm circuit to reach a maximum switching frequency; and/or in a case that the output current of the second bridge arm circuit reaches the first predetermined current, controlling the first bridge arm circuit to stop operating.

In an embodiment, the gradually adjusting phases of driving signals outputted to two bridge arm branches in the first bridge arm circuit to adjust an output current of the second bridge arm circuit includes: gradually adjusting the phases of the driving signals outputted to the two bridge arm branches in the first bridge arm circuit to adjust a phase shift angle between the driving signals outputted to the two bridge arm branches in the first bridge arm circuit to gradually increase from a first predetermined angle until the output current of the second bridge arm circuit reaches the first predetermined current.

In an embodiment, the gradually adjusting phases of driving signals outputted to two bridge arm branches in the second bridge arm circuit includes: gradually adjusting the phases of the driving signals outputted to the two bridge arm branches in the second bridge arm circuit to adjust a phase shift angle between the driving signals outputted to the two bridge arm branches in the second bridge arm circuit to gradually decrease from a second predetermined angle to a first predetermined angle.

In an embodiment, before gradually adjusting the phases of the driving signals outputted to the two bridge arm branches in the second bridge arm circuit, the method further includes: increasing a frequency of a driving signal outputted to the second bridge arm circuit to adjust a switching frequency of the second bridge arm circuit to reach a maximum switching frequency.

A controller is further provided according to the present disclosure. The controller includes a storage unit, a processor unit, and a program for switching between a forward operation and a reverse operation. The program is stored in the storage unit and is executed by the processing unit. The program for switching between a forward operation and a reverse operation, when executed by the processing unit, causes the processing unit to perform the method for switching between a forward operation and a reverse operation of an isolated bidirectional DC-DC circuit.

A bidirectional converter is further provided according to the present disclosure. The bidirectional converter includes an isolated bidirectional DC-DC circuit and the controller.

In an embodiment, the isolated bidirectional DC-DC circuit is a CLLC resonant conversion circuit.

In an embodiment, the isolated bidirectional DC-DC circuit includes a first bridge arm circuit, a second bridge arm circuit, a first resonant inductor, a second resonant inductor, a first resonant capacitor, a second resonant capacitor, and a transformer. A first terminal of the first bridge arm circuit is connected to a first terminal of a primary coil of the transformer through the first resonant inductor, a second terminal of the primary coil of the transformer is connected to a second terminal of the first bridge arm circuit through the first resonant capacitor, a first terminal of the second bridge arm circuit is connected to a first terminal of a secondary coil of the transformer through the second resonant inductor, and a second terminal of the secondary coil of the transformer is connected to a second terminal of the second bridge arm circuit through the second resonant capacitor.

A charging system is further provided according to the present disclosure. The charging system includes: an isolated bidirectional DC-DC circuit and the controller; or the bidirectional converter.

According to the technical solutions of the present disclosure, in a case that it is required to perform switching, the second bridge arm circuit is controlled to stop performing synchronous rectification, and the phases of the driving signals outputted to the two bridge arm branches in the first bridge arm circuit are controlled to be shifted, and the first bridge arm circuit is controlled to stop operating when the output current of the second bridge arm circuit reaches the first predetermined current. Then, the driving signals outputted to the second bridge arm circuit are generated, the phases of the driving signals outputted to the two bridge arm branches in the second bridge arm circuit are controlled to be shifted, and the first bridge arm circuit is controlled to perform synchronous rectification when the output current of the second bridge arm circuit reaches the second predetermined current. Thus, the switching between operation directions is performed. According to the present disclosure, phase shifting is performed respectively on the first bridge arm circuit and the second bridge arm circuit, so that the power of the bidirectional DC-DC circuit is continuous and smooth, thereby avoiding a voltage fluctuation on the bus caused by a sudden power change, achieving a fast and smooth switching process. In addition, the switching process is simple, safe, stable, and easy to be implemented, thereby improving the efficiency of the switching between different operation directions.

BRIEF DESCRIPTION OF THE DRAWINGS

In order to more clearly illustrate the technical solutions of embodiments of the present disclosure or in the conventional technology, drawings to be used in the description of the embodiments of the present disclosure or the conventional technology are briefly described hereinafter. It is apparent that the drawings in the following description show only some embodiments of the present disclosure. Those skilled in the art can obtain other drawings based on the structures shown in these drawings without any creative efforts.

Figure 1:
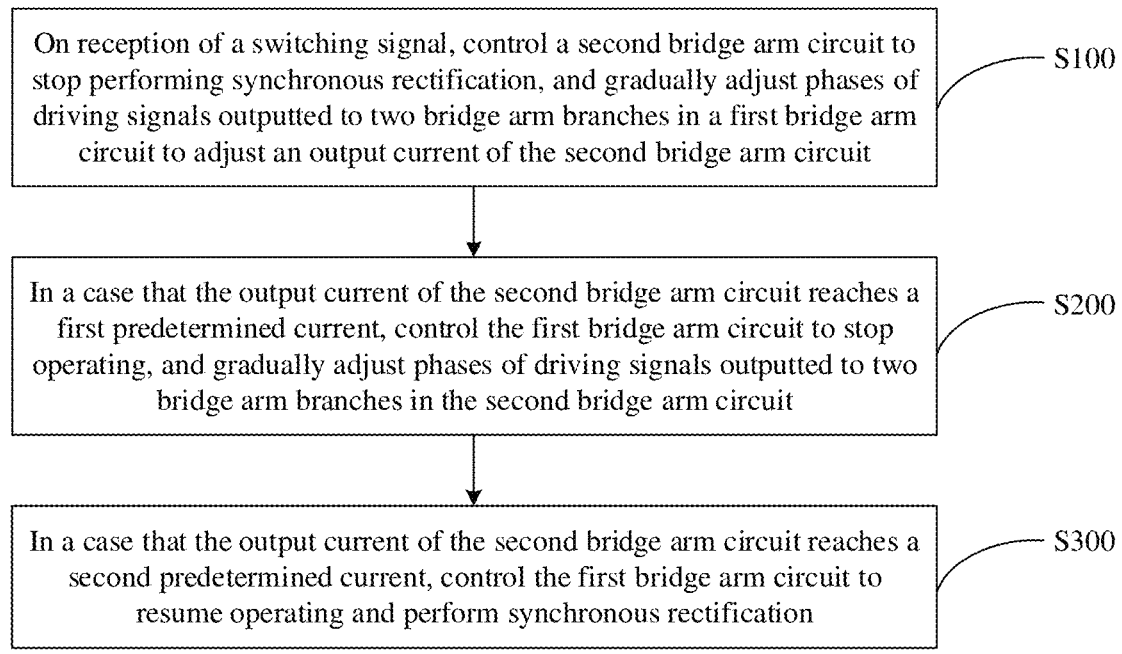
FIG. 1 is a flow chart of a method for switching between a forward operation and a reverse operation of an isolated bidirectional DC-DC circuit according to an embodiment of the present disclosure.

The realization of the objectives, functional features and advantages of the present disclosure are further described in conjunction with the embodiments and with reference to the drawings.

DETAILED DESCRIPTION

Technical solutions of embodiments of the present disclosure are clearly and completely described hereinafter in conjunction with the drawings of the embodiments of the present disclosure. Apparently, the described embodiments are only part embodiments of the present disclosure, rather than all embodiments. Other embodiments obtained by those skilled in the art without any creative efforts based on the embodiments of the present disclosure fall within the protection scope of the present disclosure.

It should be noted that, all directional indicators (such as up, down, left, right, front, back, . . . ) in the embodiment of the present disclosure are only used for explaining a relative position relationship and movement situation among components in a certain specific posture (as shown in the diagrams). If the specific posture changes, the directional indicators change accordingly.

In addition, if there are descriptions related to "first" and "second" in the embodiments of the present disclosure, the descriptions of "first" and "second" are only used for descriptive purposes, and may not be understood as indicating or implying their relative importance or implicitly indicating the number of indicated technical features. Therefore, the features defined with "first", "second" or the like may include at least one of the features explicitly or implicitly. In addition, technical solutions in the various embodiments may be combined with each other, and the combined technical solutions can be implemented by those skilled in the art. When a combination of the technical solutions is contradictory or cannot be implemented, it should be considered that such the combination of the technical solutions does not exist, and is not within the protection scope of the present disclosure.

Currently, the CLLC resonant has an isolated bidirectional DC-DC topology, having advantages such as high efficiency high power density, and achieving ZVS at a primary side and ZCS at a secondary side. Frequency conversion control is usually performed to achieve a wide voltage adjustment range. However, the power cannot be controlled to a small value due to the frequency limitation of the switching device, thus smooth switching between a forward operation and a reverse operation cannot be realized. A front-stage AC-DC converter controls a capacitor voltage of a bus, a sudden power change at a rear-stage may cause a voltage fluctuation on the bus, resulting in a current fluctuation, harmonics, and the like at a power grid side and affecting the stable operation of the converter. To solve the above problems, the following methods are usually performed.

In a method, after increasing a switching frequency to a maximum frequency, driving is directly turned off to enter into a shutdown state, and then a reverse soft-start startup is performed after a delay. With this method, although improvement is performed, the power cannot be reduced to zero, smooth switching cannot be realized, and the switching time period is long.

In a method, a hiccup mode is adopted in a case of light load. However, the hiccup mode is uncontrollable, and an output voltage/current ripple is increased.

In a method for controlling a bidirectional active bridge circuit, a phase shift angle between a primary side and a secondary side is adjusted to control a power. In normal operation, variable frequency control is adopted. In order to improve efficiency, synchronous rectification control is performed at the secondary side. The driving signal at the secondary side is passively generated based on a current direction, then it is required to actively adjust the driving signal at the secondary side to lead or lag a signal at the primary side by an angle, resulting in a problem of switching signal generation manners and increasing the control complexity. In addition, the bidirectional active bridge circuit has problems of a large turn-off current and circulating current.

In order to solve the above problems, a method for switching between a forward operation and a reverse operation of an isolated bidirectional DC-DC circuit is provided according to the present disclosure. The isolated bidirectional DC-DC circuit includes a first bridge arm circuit, a second bridge arm circuit, and a transformer arranged between the first bridge arm circuit and the second bridge arm circuit. As shown in FIG. 1, in an embodiment, the method for switching between a forward operation and a reverse operation of an isolated bidirectional DC-DC circuit includes the following steps S100 to S300.

In step S100, on reception of a switching signal, the second bridge arm circuit is controlled to stop performing synchronous rectification, and phases of driving signals outputted to two bridge arm branches in the first bridge arm circuit are gradually adjusted to adjust an output current of the second bridge arm circuit.

With the method, switching between two operation directions can be performed. Switching from a forward operation to a reverse operation is taken as an example. In a case that the isolated bidirectional DC-DC circuit performs forward operation, the first bridge arm circuit of the isolated bidirectional DC-DC circuit converts an inputted direct-current power to an alternating-current power and outputs the alternating-current power. In the first bridge arm circuit, variable frequency control is performed to achieve a wide voltage adjustment range for the conversion circuit. In the second bridge arm circuit, synchronous rectification control is performed to convert an alternating-current power to a direct-current power, and then the direct-current power is outputted.

Figure 6:
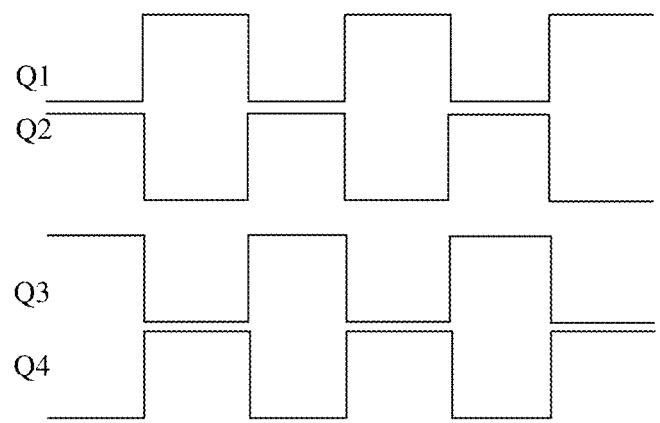
FIG. 6 is a schematic diagram showing driving signals in a method for switching between a forward operation and a reverse operation of an isolated bidirectional DC-DC circuit according to an embodiment of the present disclosure.
Figure 7:
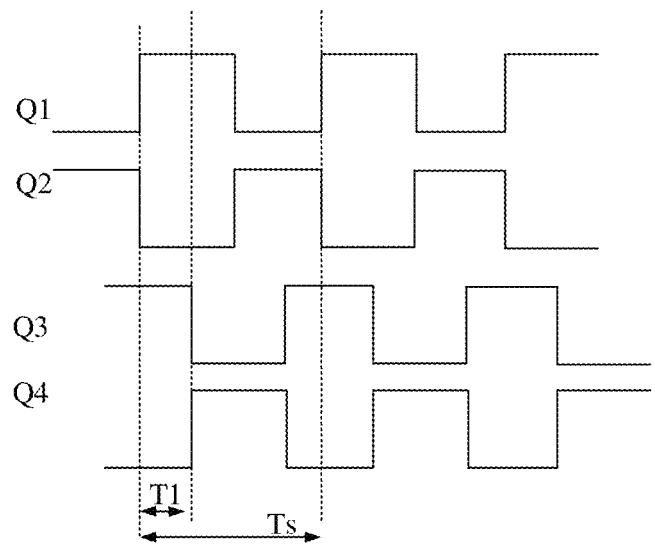
FIG. 7 is a schematic diagram showing phase shifting of driving signals in a method for switching between a forward operation and a reverse operation of an isolated bidirectional DC-DC circuit according to an embodiment of the present disclosure.

On reception of a switching signal, the second bridge arm circuit is turned off, that is, driving signals are stopped to be outputted to the second bridge arm circuit, so that the second bridge arm circuit stops performing synchronous rectification and the first bridge arm circuit operates normally. Phases of driving signals outputted to two bridge arm branches in the first bridge arm circuit are controlled to be shifted, so that an output current of the second bridge arm circuit reaches a first predetermined current. For example, in a case of the isolated bidirectional DC-DC circuit in forward operation, waveforms of driving signals of four switching transistors in the first bridge arm circuit are shown in FIG. 6. A driving signal of a first switching transistor Q1 has a same waveform as a driving signal of a fourth switching transistor Q4, a driving signal of a second switching transistor Q2 has a same waveform as a driving signal of a third switching transistor Q3, then a phase shift angle between the driving signals of the two bridge arm branches is 0°. The phases of the driving signals of the two bridge arm branches in the first bridge arm circuit are controlled to be shifted, that is, waveforms of the driving signals of the first switching transistor Q1 and the second switching transistor Q2 are controlled to be staggered by an angle with waveforms of the driving signals of the third switching transistor Q3 and the fourth switching transistor Q4. As shown in FIG. 7, Ts represents a switching cycle. In a case of T1=0, the phase shift angle is equal to 0°. In a case of T1=Ts/2, the phase shift angle is equal to 180°. It should be understood that when the phase shift angle increases from 0°, a waveform of the driving signal of the first switching transistor Q1 is staggered from a waveform of the driving signal of the fourth switching transistor Q4, and a waveform of the driving signal of the second switching transistor Q2 is staggered from a waveform of the driving signal of the third switching transistor Q3, thus the current of the first bridge arm circuit gradually decreases and the output current of the second bridge arm circuit, that is the current Iout, gradually decreases. Therefore, the output current Iout of the second bridge arm circuit may be gradually reduced by increasing the phase shift angle. The first predetermined current may be set according to actual application requirements. The first predetermined current may be set to zero or a value close to zero. When the output current Iout of the second bridge arm circuit is adjusted to the first predetermined current, the first bridge arm circuit is controlled to stop operating. It should be noted that in a case that the output current of the second bridge arm circuit is positive and not equal to zero, the power of the bidirectional DC-DC circuit is discontinuous (that is, the power of the bidirectional DC-DC circuit suddenly changes from positive to negative) if the bidirectional DC-DC circuit is directly switched to performing reverse operation, resulting in a significant voltage fluctuation on the bus and then damaging the bidirectional DC-DC circuit. Therefore, small gain adjustment is realized by performing phase shifting control according to the present disclosure, so that the current is adjusted to be equal to zero or close to zero before the operation direction of the bidirectional DC-DC circuit is switched from one operation direction to another operation direction, thereby performing safe and stable bidirectional switching for the bidirectional DC-DC circuit.

In step S200, in a case that the output current of the second bridge arm circuit reaches a first predetermined current, the first bridge arm circuit is controlled to stop operating, and phases of driving signals outputted to two bridge arm branches in the second bridge arm circuit are gradually adjusted.

Figure 8:
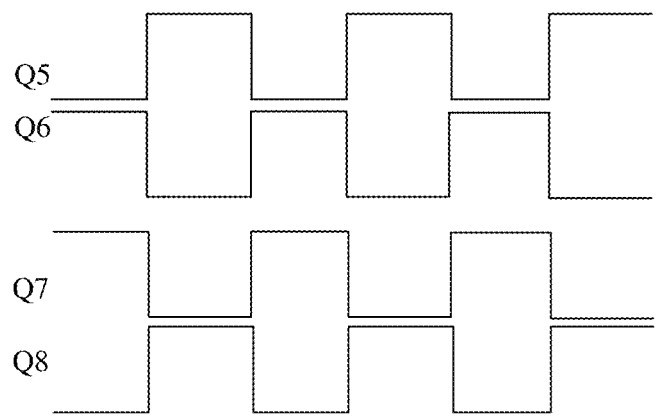
FIG. 8 is a schematic diagram showing driving signals in a method for switching between a forward operation and a reverse operation of an isolated bidirectional DC-DC circuit according to another embodiment of the present disclosure.
Figure 9:
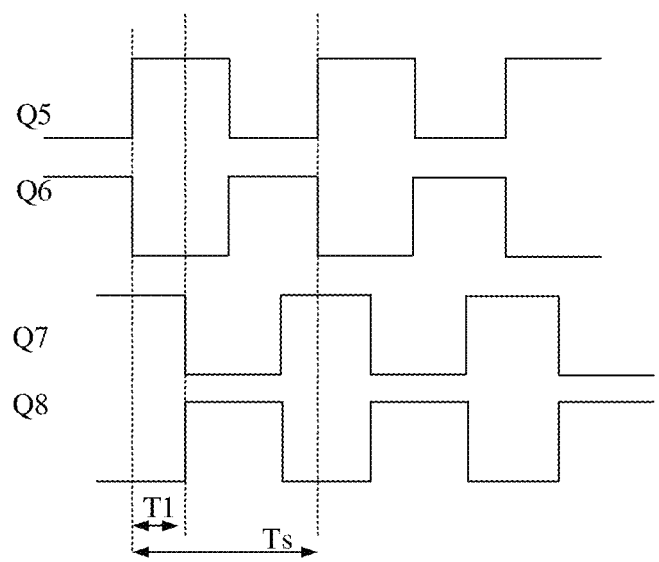
FIG. 9 is a schematic diagram showing phase shifting of driving signals in a method for switching between a forward operation and a reverse operation of an isolated bidirectional DC-DC circuit according to another embodiment of the present disclosure.

After the first bridge arm circuit is controlled to stop operating, driving signals for the second bridge arm circuit are generated, and then the phases of the driving signals for the two bridge arm branches in the second bridge arm circuit are controlled to be shifted, that is, the waveforms of the driving signal outputted to the two bridge arm branches in the second bridge arm circuit are controlled to be staggered by an angle. For example, in a case of the isolated bidirectional DC-DC circuit performing reverse operation, waveforms of driving signals of four switching transistors in the second bridge arm circuit are shown in FIG. 8. A driving signal of a fifth switching transistor Q5 has a same waveform as a driving signal of an eighth switching transistor Q8, a driving signal of a sixth switching transistor Q6 has a same waveform as a driving signal of a seventh switching transistor Q7, then a phase shift angle between the driving signals outputted to the two bridge arm branches is 0°. Similarly to performing phase shifting on the first bridge arm circuit, the phases of the driving signals of the two bridge arm branches in the second bridge arm circuit are controlled to be shifted, that is, waveforms of the driving signals of the fifth switching transistor Q5 and the sixth switching transistor Q6 are controlled to be staggered by an angle with waveforms of the driving signals of the seventh switching transistor Q7 and the eighth switching transistor Q8. It should be understood that phase shifting is performed on the first bridge arm circuit to gradually reduce the current to zero or close to zero, and phase shifting is performed on the second bridge arm circuit to gradually increase the current. Therefore, in the embodiment, the phase shift angle between the driving signals of the two bridge arm branches in the second bridge arm circuit may be controlled to decrease from 180° to 0°, that is, the output current of the second bridge arm circuit is controlled to reach a second predetermined current. The second predetermined current may be set according to actual application requirements. The second predetermined current may be set to a current when the second bridge arm circuit normally operates. Similarly, phase shifting is performed on the second bridge arm circuit to control the current to increase from zero, so that the power of the bidirectional DC-DC circuit is continuous, reducing the voltage fluctuation on the bus and improving the stability and safety of the bidirectional DC-DC circuit.

In step S300, in a case that the output current of the second bridge arm circuit reaches a second predetermined current, the first bridge arm circuit is controlled to resume operating and perform synchronous rectification.

In a case that the output current of the second bridge arm circuit reaches the second predetermined current, that is, after phase shifting is performed on the second bridge arm circuit, the first bridge arm circuit is controlled to perform synchronous rectification. Thus, the first bridge arm circuit performs synchronous rectification on an alternating-current power outputted by the second bridge arm circuit to output a direct-current power. In this way, the bidirectional DC-DC circuit starts to perform reverse operation. It should be noted that the isolated bidirectional DC-DC circuit has a symmetrical topology at the primary side and the secondary side, and thus the switching from the reverse operation to the forward operation is the same as the switching from the forward operation to the reverse operation. Since the switching process is performed quickly and consumes low power, transistors for synchronous recitation may be turned off during the switching process and then are turned on after the isolated bidirectional DC-DC circuit performing forward operation or reverse operation.

According to the technical solutions of the present disclosure, in a case that it is required to perform switching, the second bridge arm circuit is controlled to stop performing synchronous rectification, and the phases of the driving signals outputted to the two bridge arm branches in the first bridge arm circuit are controlled to be shifted, and the first bridge arm circuit is controlled to stop operating when the output current of the second bridge arm circuit reaches the first predetermined current. Then, the driving signals outputted to the second bridge arm circuit are generated, the phases of the driving signals outputted to the two bridge arm branches in the second bridge arm circuit are controlled to be shifted, and the first bridge arm circuit is controlled to perform synchronous rectification when the output current of the second bridge arm circuit reaches the second predetermined current. Thus, the switching between operation directions is performed. According to the present disclosure, phase shifting is performed respectively on the first bridge arm circuit and the second bridge arm circuit, so that the power of the bidirectional DC-DC circuit is continuous and smooth, thereby avoiding a voltage fluctuation on the bus caused by a sudden power change, achieving a fast and smooth switching process. In addition, the switching process is simple, safe, stable, and easy to be implemented, thereby improving the efficiency of the switching between different operation directions.

Figure 2:
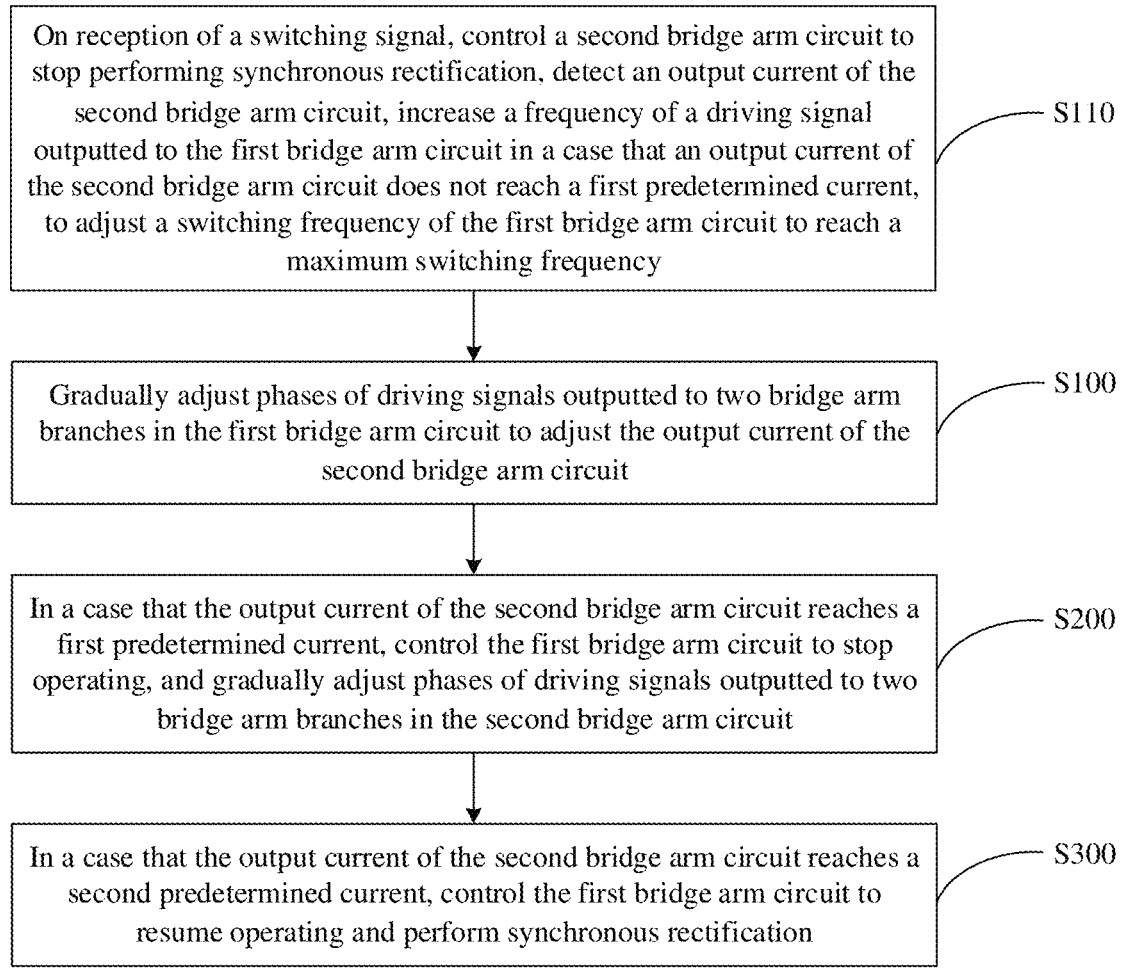
FIG. 2 is a flow chart of a method for switching between a forward operation and a reverse operation of an isolated bidirectional DC-DC circuit according to an embodiment of the present disclosure.

As shown in FIG. 2, in an embodiment, before the step in which the phases of the driving signals outputted to the two bridge arm branches in the first bridge arm circuit are gradually adjusted, the method further includes the following step S110.

In step S110, the output current of the second bridge arm circuit is detected. In a case that the output current of the second bridge arm circuit does not reach the first predetermined current, a frequency of the driving signal outputted to the first bridge arm circuit is increased, so that a switching frequency of the first bridge arm circuit reaches a maximum switching frequency. In a case that the output current of the second bridge arm circuit reaches the first predetermined current, the first bridge arm circuit is controlled to stop operating.

It should be understood that in a bridge arm circuit, a high switching frequency of a switching transistor indicates a small gain and a small current flowing through the switching transistor. Therefore, in order to achieve a continuous and smooth power of the bidirectional DC-DC circuit, before phase shifting is performed on the first bridge arm circuit, the switching frequency of the first bridge arm circuit is directly adjusted to a maximum switching frequency in the embodiment. That is, the gain cannot be reduced by adjusting the switching frequency. Then, small gain adjustment may be performed by controlling the first bridge arm circuit, so that the power of the bidirectional DC-DC circuit is continuous and smooth. With the method in the embodiment, the gain is adjusted by adjusting the switching frequency and performing phase shifting on the first bridge arm circuit, so that the power of the bidirectional DC-DC circuit is continuous and smooth, avoiding a voltage fluctuation on the bus caused by a sudden power change and improving the safety and stability of the switching between operation directions.

Figure 3:
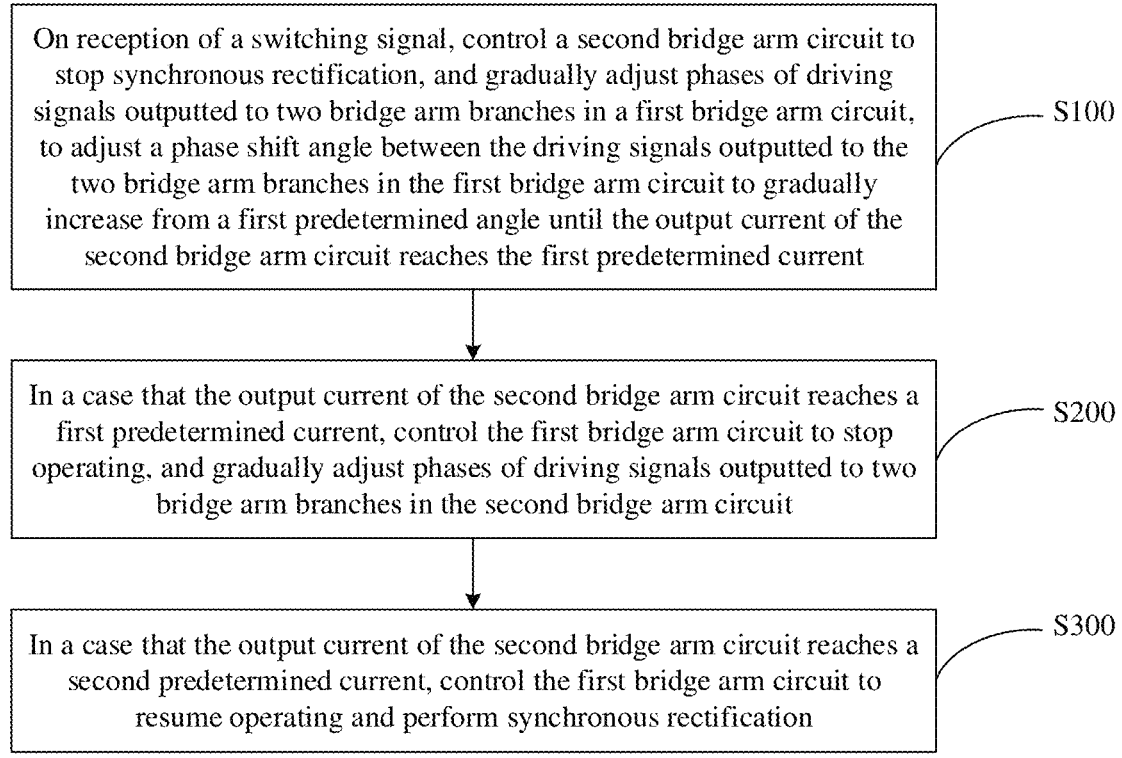
FIG. 3 is a flow chart of a method for switching between a forward operation and a reverse operation of an isolated bidirectional DC-DC circuit according to another embodiment of the present disclosure.

As shown in FIG. 3, in an embodiment, the step in which the phases of the driving signals outputted to the two bridge arm branches in the first bridge arm circuit are gradually adjusted to adjust an output current of the second bridge arm circuit includes: gradually adjusting the phases of the driving signals outputted to the two bridge arm branches in the first bridge arm circuit to adjust a phase shift angle between the driving signals outputted to the two bridge arm branches in the first bridge arm circuit to gradually increase from a first predetermined angle until the output current of the second bridge arm circuit reaches the first predetermined current.

In an embodiment, in a case of the isolated bidirectional DC-DC circuit performing forward operation, waveforms of driving signals of four switching transistors in the first bridge arm circuit are shown in FIG. 6. A driving signal of a first switching transistor Q1 has a same waveform as a driving signal of a fourth switching transistor Q4, a driving signal of a second switching transistor Q2 has a same waveform as a driving signal of a third switching transistor Q3, then a phase shift angle between the driving signals of the two bridge arm branches is 0°. The phases of the driving signals of the two bridge arm branches in the first bridge arm circuit are controlled to be shifted, that is, waveforms of the driving signals of the first switching transistor Q1 and the second switching transistor Q2 are controlled to be staggered by an angle with waveforms of the driving signals of the third switching transistor Q3 and the fourth switching transistor Q4. As shown in FIG. 7, Ts represents a switching cycle. In a case of T1=0, the phase shift angle is equal to 0°. In a case of T1=Ts/2, the phase shift angle is equal to 180°. It should be understood that when the phase shift angle increases from 0°, a waveform of the driving signal of the first switching transistor Q1 is staggered from a waveform of the driving signal of the fourth switching transistor Q4, and a waveform of the driving signal of the second switching transistor Q2 is staggered from a waveform of the driving signal of the third switching transistor Q3, and thus the output current of the second bridge arm circuit gradually decreases. Therefore, the output current of the second bridge arm circuit may be gradually reduced by increasing the phase shift angle. In a case that the isolated bidirectional DC-DC circuit performs forward operation, the phase shift angle between the driving signals of the two bridge arm branches is 0°. Thus, the first predetermined angle may be set to 0°, so that the phase shift angle between the driving signals of the two bridge arm branches gradually increases from 0°, and the output current of the second bridge arm circuit gradually decreases to the first predetermined current. The first predetermined current may be set according to actual application requirements. The first predetermined current may be set to zero or a value close to zero. When the output current of the second bridge arm circuit is adjusted to the first predetermined current, the first bridge arm circuit is controlled to stop operating. It should be noted that in a case that the output current of the second bridge arm circuit is positive and not equal to zero, the power of the bidirectional DC-DC circuit is discontinuous (that is, the power of the bidirectional DC-DC circuit suddenly changes from positive to negative) if the bidirectional DC-DC circuit is directly switched to performing reverse operation, resulting in a significant voltage fluctuation on the bus and then damaging to the bidirectional DC-DC circuit. Therefore, small gain adjustment is realized by performing phase shifting control according to the present disclosure, so that the current is adjusted to be equal to zero or close to zero before the operation direction of the bidirectional DC-DC circuit is switched from one operation direction to another operation direction, thereby performing safe and stable bidirectional switching for the bidirectional DC-DC circuit.

Figure 4:
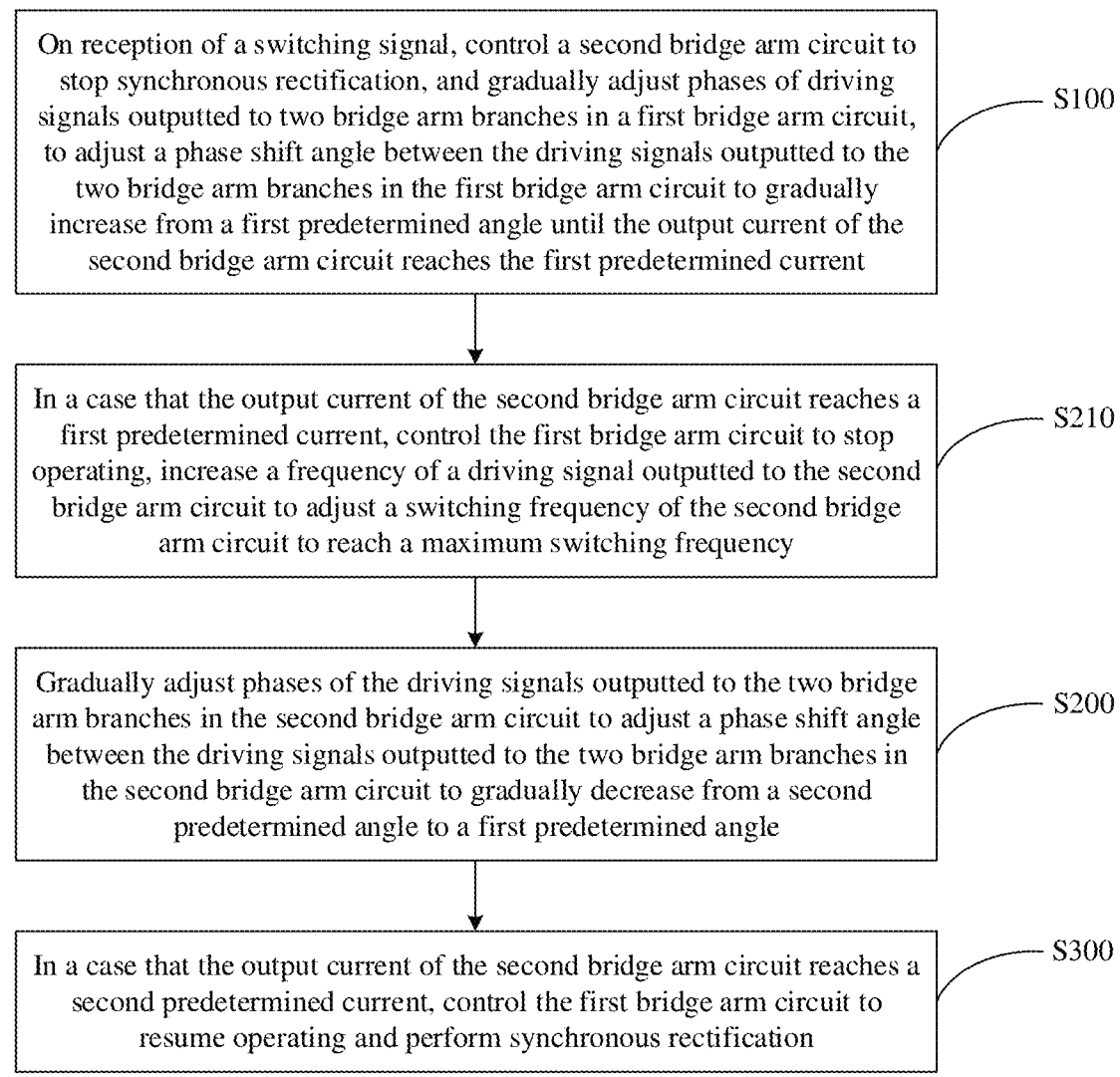
FIG. 4 is a flow chart of a method for switching between a forward operation and a reverse operation of an isolated bidirectional DC-DC circuit according to another embodiment of the present disclosure.

As shown in FIG. 4, in an embodiment, the step in which the phases of the driving signals outputted to the two bridge arm branches in the second bridge arm circuit are gradually adjusted includes: gradually adjusting the phases of the driving signals outputted to the two bridge arm branches in the second bridge arm circuit to adjust a phase shift angle between the driving signals outputted to the two bridge arm branches in the second bridge arm circuit to gradually decrease from a second predetermined angle to a first predetermined angle.

In an embodiment, in a case of the isolated bidirectional DC-DC circuit performing reverse operation, waveforms of driving signals of four switching transistors in the second bridge arm circuit are shown in FIG. 8. A driving signal of a fifth switching transistor Q5 has a same waveform as a driving signal of an eighth switching transistor Q8, a driving signal of a sixth switching transistor Q6 has a same waveform as a driving signal of a seventh switching transistor Q7, then a phase shift angle between driving signals of the two bridge arm branches is 0°. Similarly to performing phase shifting on the first bridge arm circuit, the phases of the driving signals of the two bridge arm branches in the second bridge arm circuit are controlled to be shifted, that is, waveforms of the driving signals of the fifth switching transistor Q5 and the sixth switching transistor Q6 are controlled to be staggered by an angle with waveforms of the driving signals of the seventh switching transistor Q7 and the eighth switching transistor Q8. It should be understood that phase shifting is performed on the first bridge arm circuit to gradually reduce the current to zero or close to zero, and phase shifting is performed on the second bridge arm circuit to gradually increase the current. Therefore, in the embodiment, the first predetermined angle may be 0°, and the second predetermined angle may be 180°, so that the phase shift angle between the driving signals of the two bridge arm branches in the second bridge arm circuit may be decreased from 180° to 0°, that is, the output current of the second bridge arm circuit may reach the second predetermined current. The second predetermined current may be set according to actual application requirements. The second predetermined current may be set to a current when the second bridge arm circuit normally operates. Similarly, phase shifting is performed on the second bridge arm circuit to control the current to increase from zero, so that the power of the bidirectional DC-DC circuit is continuous, reducing the voltage fluctuation on the bus and improving the stability and safety of the bidirectional DC-DC circuit.

Before the phases of the driving signals outputted to the two bridge arm branches in the second bridge arm circuit are gradually adjusted, the method further includes the following step S210.

In step S210, the frequency of the driving signal outputted to the second bridge arm circuit is increased, so that a switching frequency of the second bridge arm circuit reaches a maximum switching frequency.

It should be understood that in a bridge arm circuit, a high switching frequency of a switching transistor indicates a small gain and a small current flowing through the switching transistor. Therefore, in order to achieve a continuous and smooth power of the bidirectional DC-DC circuit, before phase shifting is performed on the second bridge arm circuit, the switching frequency of the second bridge arm circuit is directly adjusted to a maximum switching frequency in the embodiment. That is, the gain cannot be reduced by adjusting the switching frequency. Then, small gain adjustment may be performed by controlling the second bridge arm circuit, so that the power of the bidirectional DC-DC circuit is continuous and smooth. With the method in the embodiment, the gain is adjusted by adjusting the switching frequency and performing phase shifting on the second bridge arm circuit, so that the power of the bidirectional DC-DC circuit is continuous and smooth, avoiding a voltage fluctuation on the bus caused by a sudden power change and improving the safety and stability of the switching between operation directions.

A controller is further provided according to the present disclosure. The controller includes a storage unit, a processor unit, and a program for switching between a forward operation and a reverse operation. The program is stored in the storage unit and is executable by the processing unit. The program for switching between a forward operation and a reverse operation, when executed by the processing unit, causes the processing unit to perform the method for switching between a forward operation and a reverse operation of an isolated bidirectional DC-DC circuit.

For the detail structure of the method for switching between a forward operation and a reverse operation of an isolated bidirectional DC-DC circuit, one may refer to the above embodiments. Since the controller adopts all the technical solutions in the above embodiments, the controller has at least all the beneficial effects of the technical solutions in the above embodiments. The beneficial effects are not repeated herein.

A bidirectional converter is further provided according to the present disclosure. The bidirectional converter includes an isolated bidirectional DC-DC circuit and the controller. The detail structure of the controller may refer to the above embodiments. Since the bidirectional converter adopts all the technical solutions in the above embodiments, the bidirectional converter has at least all the beneficial effects of the technical solutions in the the bidirectional converter embodiments. The beneficial effects are not repeated herein.

In an embodiment, the isolated bidirectional DC-DC circuit is a CLLC resonant conversion circuit.

In an embodiment, the isolated bidirectional DC-DC circuit includes a first bridge arm circuit, a second bridge arm circuit, a first resonant inductor, a second resonant inductor, a first resonant capacitor, a second resonant capacitor, and a transformer.

A first terminal of the first bridge arm circuit is connected to a first terminal of a primary coil of the transformer through the first resonant inductor. A second terminal of the primary coil of the transformer is connected to a second terminal of the first bridge arm circuit through the first resonant capacitor. A first terminal of the second bridge arm circuit is connected to a first terminal of a secondary coil of the transformer through the second resonant inductor. A second terminal of the secondary coil of the transformer is connected to a second terminal of the second bridge arm circuit through the second resonant capacitor.

Figure 5:
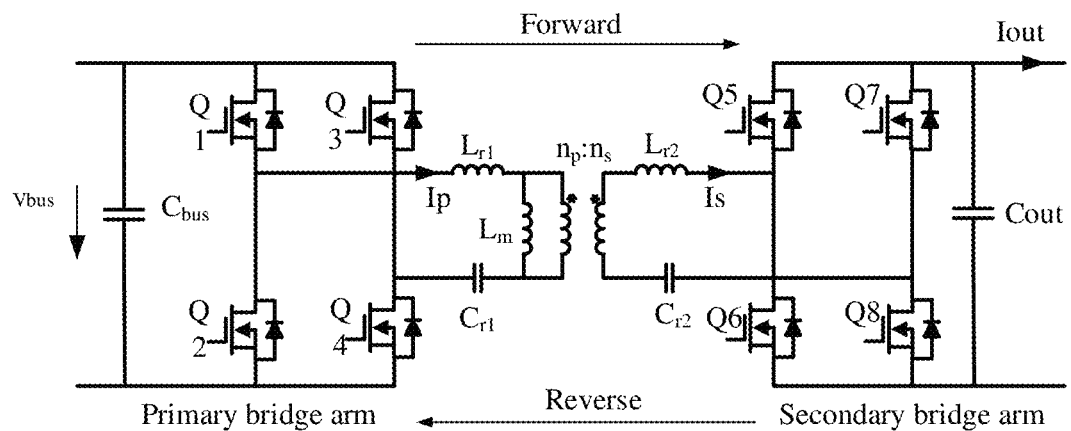
FIG. 5 is a schematic structural diagram of an isolated bidirectional DC-DC circuit according to an embodiment of the present disclosure.

Reference is made to FIG. 5, which is a schematic structural diagram of an isolated bidirectional DC-DC circuit according to an embodiment of the present disclosure. The isolated bidirectional DC-DC circuit in FIG. 5 is a CLLC resonant conversion circuit. A first switching transistor Q1, a second switching transistor Q2, a third switching transistor Q3, and a fourth switching transistor Q4 form a first bridge arm circuit, that is, a primary bridge arm circuit. A fifth switching transistor Q5, a sixth switching transistor Q6, a seventh switching transistor Q7, and an eighth switching transistor Q8 form a second bridge arm circuit, that is, a secondary bridge arm circuit. In a case that the CLLC resonant conversion circuit performs a forward operation, the first bridge arm circuit is configured to invert an inputted direct-current power to an alternating-current power, and the second bridge arm circuit is configured to perform synchronous rectification on the alternating-current power, and then a direct-current power is outputted. In a case that the CLLC resonant conversion circuit is switched to performing reverse operation, the second bridge arm circuit is configured to invert an inputted direct-current power to an alternating-current power, and the first bridge arm circuit is configured to perform synchronous rectification on the alternating-current power, and then a direct-current power is outputted. It should be understood that the method for switching between a forward operation and a reverse operation of an isolated bidirectional DC-DC circuit may be applied to the CLLC resonant conversion circuit, and may further be applied to other isolated bidirectional DC-DC circuits with the similar structure to performing switching between different operation directions.

A charging system is further provided according to the present disclosure. The charging system includes an isolated bidirectional DC-DC circuit and the controller. Alternatively, the charging system includes the bidirectional converter. The detail structure of the controller or the bidirectional converter may refer to the above embodiments. Since the charging system adopts all the technical solutions in the above embodiments, the charging system has at least all the beneficial effects of the technical solutions in the above embodiments. The beneficial effects are not repeated herein.

The foregoing descriptions are only preferred embodiments of the present disclosure, which does not limit the patent scope of the present disclosure. Under the inventive concept of the present disclosure, any equivalent structural transformation made by using the contents of the specification and drawings of the present disclosure or direct/indirect application in other related technical fields is included in the patent protection scope of the present disclosure.

The invention claimed is:

1. A method for switching between a forward operation and a reverse operation of an isolated bidirectional direct current-direct current (DC-DC) circuit, wherein the isolated bidirectional DC-DC circuit comprises a first bridge arm circuit, a second bridge arm circuit, and a transformer arranged between the first bridge arm circuit and the second bridge arm circuit, wherein the method comprises:
   on reception of a switching signal, controlling the second bridge arm circuit to stop performing synchronous rectification, and gradually adjusting phases of driving signals outputted to two bridge arm branches in the first bridge arm circuit to adjust an output current of the second bridge arm circuit;
   in a case that the output current of the second bridge arm circuit reaches a first predetermined current, controlling the first bridge arm circuit to stop operating, and gradually adjusting phases of driving signals outputted to two bridge arm branches in the second bridge arm circuit; and
   in a case that the output current of the second bridge arm circuit reaches a second predetermined current, controlling the first bridge arm circuit to resume operating and perform synchronous rectification.

2. The method for switching between the forward operation and the reverse operation of the isolated bidirectional DC-DC circuit according to claim 1, wherein before gradually adjusting the phases of the driving signals outputted to the two bridge arm branches in the first bridge arm circuit, the method further comprises:
   detecting the output current of the second bridge arm circuit;
   in a case that the output current of the second bridge arm circuit does not reach the first predetermined current, increasing a frequency of a driving signal outputted to the first bridge arm circuit to adjust a switching frequency of the first bridge arm circuit to reach a maximum switching frequency; and/or in a case that the output current of the second bridge arm circuit reaches the first predetermined current, controlling the first bridge arm circuit to stop operating.

3. The method for switching between the forward operation and the reverse operation of the isolated bidirectional DC-DC circuit according to claim 1, wherein the gradually adjusting phases of driving signals outputted to two bridge arm branches in the first bridge arm circuit to adjust the output current of the second bridge arm circuit comprises:

gradually adjusting the phases of the driving signals outputted to the two bridge arm branches in the first bridge arm circuit to adjust a phase shift angle between the driving signals outputted to the two bridge arm branches in the first bridge arm circuit to gradually increase from a first predetermined angle until the output current of the second bridge arm circuit reaches the first predetermined current.

4. The method for switching between the forward operation and the reverse operation of the isolated bidirectional DC-DC circuit according to claim 1, wherein the gradually adjusting phases of driving signals outputted to two bridge arm branches in the second bridge arm circuit comprises:

gradually adjusting the phases of the driving signals outputted to the two bridge arm branches in the second bridge arm circuit to adjust a phase shift angle between the driving signals outputted to the two bridge arm branches in the second bridge arm circuit to gradually decrease from a second predetermined angle to a first predetermined angle.

5. The method for switching between the forward operation and the reverse operation of the isolated bidirectional DC-DC circuit according to claim 4, wherein before gradually adjusting the phases of the driving signals outputted to the two bridge arm branches in the second bridge arm circuit, the method further comprises:

increasing a frequency of a driving signal outputted to the second bridge arm circuit to adjust a switching frequency of the second bridge arm circuit to reach a maximum switching frequency.

6. A controller, comprising:
a storage unit;
a processor unit; and
a program for switching between a forward operation and a reverse operation, stored in the storage unit and executed by the processing unit; wherein
the program for switching between the forward operation and the reverse operation, when executed by the processing unit, causes the processing unit to perform the method for switching between the forward operation and the reverse operation of the isolated bidirectional DC-DC circuit according to claim 1.

7. A bidirectional converter, comprising the isolated bidirectional DC-DC circuit and the controller according to the claim 6.

8. The bidirectional converter according to claim 7, wherein the isolated bidirectional DC-DC circuit is a CLLC resonant conversion circuit.

9. The bidirectional converter according to claim 7, wherein the isolated bidirectional DC-DC circuit comprises the first bridge arm circuit, the second bridge arm circuit, a first resonant inductor, a second resonant inductor, a first resonant capacitor, a second resonant capacitor, and the transformer, wherein a first terminal of the first bridge arm circuit is connected to a first terminal of a primary coil of the transformer through the first resonant inductor, a second terminal of the primary coil of the transformer is connected to a second terminal of the first bridge arm circuit through the first resonant capacitor, a first terminal of the second bridge arm circuit is connected to a first terminal of a secondary coil of the transformer through the second resonant inductor, and a second terminal of the secondary coil of the transformer is connected to a second terminal of the second bridge arm circuit through the second resonant capacitor.

10. A charging system, comprising the bidirectional converter according to claim 7.

11. A charging system, comprising an isolated bidirectional DC-DC circuit and the controller according to claim 6.

* * * * *